(12) United States Patent
Arsovski et al.

(10) Patent No.: US 9,218,880 B2
(45) Date of Patent: *Dec. 22, 2015

(54) PARTIAL UPDATE IN A TERNARY CONTENT ADDRESSABLE MEMORY

(71) Applicant: International Business Machines Corporation, Armonk, NY (US)

(72) Inventors: Igor Arsovski, Williston, VT (US); Derick G. Behrends, Rochester, MN (US); Todd A. Christensen, Rochester, MN (US); Travis R. Hebig, Rochester, MN (US); Michael Launsbach, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/282,298

(22) Filed: May 20, 2014

(65) Prior Publication Data
US 2015/0179261 A1    Jun. 25, 2015

Related U.S. Application Data

(63) Continuation of application No. 14/138,374, filed on Dec. 23, 2013, now Pat. No. 9,082,484.

(51) Int. Cl.
G11C 15/00     (2006.01)
G11C 15/04     (2006.01)
G06F 17/50     (2006.01)

(52) U.S. Cl.
CPC .......... *G11C 15/046* (2013.01); *G06F 17/5054* (2013.01); *G11C 15/04* (2013.01); *G06F 2217/64* (2013.01); *G06F 2217/86* (2013.01)

(58) Field of Classification Search
CPC ............. G11C 15/046; G11C 17/5054; G11C 2217/86; G06F 2217/64
USPC ........................................... 365/49.11, 49.17
See application file for complete search history.

(56) References Cited

U.S. PATENT DOCUMENTS 6,452,822 B1    9/2002   Chai et al.
6,967,856 B1    11/2005  Park et al.
(Continued)

OTHER PUBLICATIONS

Pagiamtzis et al., "Content-Addressable Memory (CAM) Circuits and Architectures: A Tutorial and Survey", IEEE Journal of Solid-State Circuits, Mar. 2006, pp. 712-727, vol. 41, No. 3, (received Mar. 19, 2005, revised Oct. 12, 2005), © 2006 IEEE. DOI: 10.1109/JSSC.2005.864128.

(Continued)

*Primary Examiner* — Fernando Hidalgo
(74) *Attorney, Agent, or Firm* — Robert A. Wilhelm; Robert Williams

(57) ABSTRACT

A TCAM may have a plurality of rows of cells. Each row may have a match line. Each cell may have elements for storing first and second bits, and compare circuitry associated to determine matches between a bit of a search word and data stored in the cell. For at least one first row of the rows, the TCAM includes a valid row cell having at least one element to store a partial update indication. The valid row cell may cause the match line associated with the first row to signal that the first row does not match a search word when the partial update indication associated with the first row is enabled. When the partial update indication associated with the first row is disabled, the determination of matches with a search word is performed solely by the compare circuitry without influence of the valid row cell.

5 Claims, 7 Drawing Sheets

(56) References Cited

U.S. PATENT DOCUMENTS

| | | |
|---|---|---|
| 7,355,872 B2 | 4/2008 | Hsu et al. |
| 7,372,713 B2 | 5/2008 | Kuliyampattil et al. |
| 7,688,611 B2 | 3/2010 | Arsovski et al. |
| 7,813,155 B1 | 10/2010 | Maheshwari |
| 7,924,588 B2 | 4/2011 | Arsovski et al. |
| 8,031,501 B1 | 10/2011 | Nataraj et al. |
| 8,913,412 B1 * | 12/2014 | Khanna et al. ............. 365/49.17 |

OTHER PUBLICATIONS

Arsovski, I., et al., "Partial Update in a Ternary Content Addressable Memory", U.S. Appl. No. 14/138,374, Filed Dec. 23, 2013, IBM Docket No. ROC920130226US1.

* cited by examiner

PARTIAL UPDATE IN A TERNARY CONTENT ADDRESSABLE MEMORY

BACKGROUND

Embodiments generally relate to content addressable memories, and more particularly to storing data in ternary content addressable memories.

A content addressable memory (CAM) is a storage device typically used for storing data words. A CAM generally stores a large number of data words, e.g., 32K words. In addition, a CAM data word generally includes a relatively large number of bits, e.g., 36 to 144 bits. The bits stored in a CAM data word may be addressed in two ways. First, each bit in a CAM may be addressed according to a uniquely identifiable storage element. For example, each CAM data word may have a row address and each bit in a word may have a column address. Second, a CAM data word may be addressed by the content of the data word. It is this later method of addressing that makes a CAM useful in certain applications.

Addressing a CAM data word by content involves comparing a search word with all of the CAM data words stored in the CAM. The search word may be compared with all with all of the CAM data words in parallel. For example, a CAM may be used to store network addresses. A CAM used for storing network addresses might store 32K data words, each word being a 144 bit address. The CAM might be used in a network router and the CAM would enable an address of a data packet received by the router to be compared with all of the addresses stored in the CAM. Typically, a search word can be compared with all of the stored CAM data words in a single cycle. If the search word identically matches one or more of the stored CAM data words, a match line corresponding with the CAM data word is asserted. The match lines may be fed to a match line sense amplifier having its output coupled with an encoder. The encoder generates a match location corresponding with the match line of the matching CAM data word. Continuing the example of CAM data words being network addresses, the match location may identify a destination where a data packet should be forwarded.

A ternary CAM (TCAM) is a variation on a CAM. While a CAM requires that the search word identically match a stored CAM data word, a TCAM does not require that the search word identically match a stored TCAM data word. This is because a TCAM provides two bits for each bit of the search word, whereas a CAM provides a single bit. The two bits per search word bit allow a TCAM to store a code that may represent a logic 1, a logic 0, or both a logic 1 and a logic 0. When a stored bit of a TCAM word represents both a logic 1 and a logic 0, it may be denoted by an "X" and referred to as a "don't care" value. Accordingly, if the TCAM code corresponding with a bit of a search word data is an X, the search word bit will always match the TCAM code, regardless of whether the search word bit is a logic 1 or a logic 0. Other than this capability to store "don't care" values, a TCAM may function similarly to a CAM.

SUMMARY

Various embodiments are directed to a TCAM. The TCAM may have a plurality of rows of cells. Each row may have a match line. Each cell may have elements for storing first and second bits. Each cell may have compare circuitry associated with the cell to determine matches between a bit of a search word and data stored in the cell. For at least one first row of the rows, the TCAM includes a valid row cell. The valid row cell may have at least one element to store a partial update indication. The valid row cell may cause the match line associated with the first row to signal that the first row does not match a search word when the partial update indication associated with the first row is enabled. In addition, when the partial update indication associated with the first row is disabled, the determination of matches between bits of a search word and data stored in cells of the first row is performed solely by the compare circuitry without influence of the valid row cell.

Other embodiments are directed to methods for accessing a TCAM. The TCAM may have a plurality of rows of cells. Each row may have a match line. Each cell may have elements for storing first and second bits. Each cell may include compare circuitry for determining matches between a bit of a search word and data stored in the cell. The compare circuitry to signal a match on a match line of an associated row. Various methods may include storing a first bit in a first storage element of a cell in a first row of the TCAM. A valid row cell may be associated with the first row. The valid row cell may have at least one element to store a partial update indication. In response to storing the first bit in the first storage element, a partial update indication associated with the first row of the TCAM may be enabled. In response to a signal to determine matches between bits of a search word and data stored the cells, when the indication associated with the first row of the TCAM is enabled, a signal indicating that the first row of the TCAM does not match the search word may be provided by the valid row cell. In addition, methods may include storing a second bit in the first storage element. In response to storing the second bit in the first storage element, the partial update indication associated with the first row of the TCAM may be disabled. In response to the signal to determine matches between bits of a search word and data stored the cells, when the partial update indication associated with the first row is disabled, the determination of matches between bits of a search word and data stored in cells of the first row is performed solely by the compare circuitry without influence of the valid row cell.

Yet other embodiments are directed to a design structure for a TCAM.

BRIEF DESCRIPTION OF THE SEVERAL VIEWS OF THE DRAWINGS

In the drawings and the Detailed Description, like numbers generally refer to like components, parts, steps, and processes.

DETAILED DESCRIPTION

A TCAM may require two cycles to update a functional cell. During operation, the TCAM may have a single spare cycle that occurs between searches, but the TCAM may not be able to make use of the cycle to update a functional cell because two cycles are needed. According to various embodiments, a valid row cell is provided in each row of TCAM. The valid row cell stores a partial update indication. When a functional cell has been partially updated, the valid row cell signals a match line for the row that the row does not match a search word. When the update is complete, the valid row cell provides a "don't care" signal to the match line. The valid row cell enables a TCAM to make use of a single spare cycle.

Figure 1:
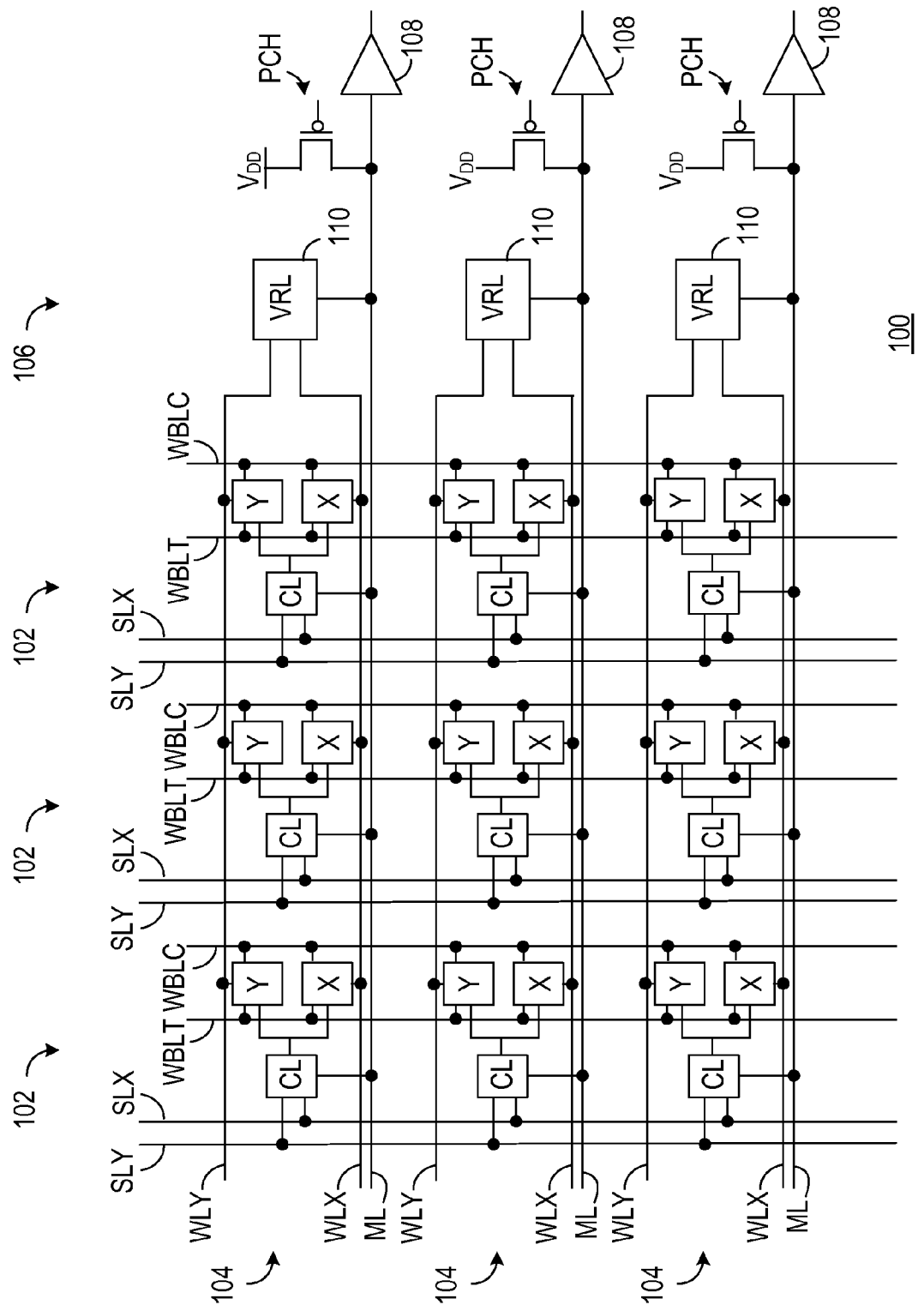
FIG. 1 is a block diagram of an exemplary TCAM according to various embodiments.

FIG. 1 is a block diagram of an exemplary TCAM 100 according to various embodiments. The TCAM 100 may be an XY style NOR TCAM in various embodiments. The shown TCAM 100 includes nine functional cells arranged in three columns 102 and three rows 104. Each row stores a TCAM word. Each functional cell corresponds with one bit of a search word. Each functional cell includes two storage elements, one for an "X" bit and one for a "Y" bit. In addition, each functional cell includes compare logic CL. Although the TCAM 100 is 3×3 array of functional cells, in various embodiments, embodiments may be used with a TCAM array having hundreds or thousands of bits in the row and column directions. The nine functional cells are depicted for illustrative purposes. As described below, the functional cells of TCAM 100 may be addressed in two ways.

Each row of the TCAM 100 may include a valid row logic cell 110 according to various embodiments, i.e., a valid row logic cell 110 ("VRL") may be provided for each TCAM data word. According to various embodiments, the valid row logic 110 may modify the results obtained when searching a TCAM based on content.

Addressing Methods

First, each functional cell may have a row address and a column address. The X bit of a cell may be addressed using the word line X (WLX) for the row 104. The Y bit may be addressed using the word line Y (WLY) for the row 104. A bit may be stored in an X or Y storage element by placing the bit and its compliment respectively on the write bit line (WBLT) and on the write bit line complement line (WBLC) for the column 102. Once the bits are on WBLT and WBLC, WLX or WLY is asserted. Two cycles may be required to store a TCAM word in a row 104 of the TCAM 100. In a first cycle, the X values may be stored. In a second cycle, the Y values may be stored.

Second, a TCAM data word may be addressed by the content of the word. Each row is associated with a match line (ML). Each match line may be coupled with a precharge device (PCH). In a content search, the match lines of the TCAM 100 may be precharged to a logic high value by precharge devices PCH. Bits of a search word are placed on respective X search lines (SLX). The complements of the bits of the search word are placed on respective Y search lines (SLY). If the code (1, 0, or X) stored in a functional cell does not match the bits placed on the search lines, the compare logic CL for the functional cell pulls the match line ML to a logic low value. A miss is indicated by the match line ML being in a logic low state. On the other hand, a match is indicated by the match line ML being in a logic high state. If the codes stored in the functional cells of a row match the corresponding bits of the search word, then the compare logic CL does not pull the match line low. If a match line stays high, it signals that the search word matches all of the bits of the stored TCAM word. Each match line ML may be coupled with a match line sense amplifier 108. The match line sense amplifier 108 senses the state of each match line ML and outputs the states to an encoder (not shown).

In various embodiments, the precharge device PCH may be formed from a PMOS transistor having its source coupled to a voltage supply, its drain coupled with a match line, and its gate coupled with a precharge signal. In various alternative embodiments, the precharge device may be formed from an NMOS transistor.

In an alternative embodiment, elements of the TCAM 100 described herein as being associated with or arranged in a column may be associated with or arranged in a row. Similarly, elements the TCAM 100 described herein as being associated with or arranged in a row may be associated with or arranged in a column. In other words, the words "column" and "row," as used herein, should not be limited to a vertical and horizontal orientation; each term may refer to either orientation.

Valid Row Cell

Often, a TCAM may perform many searches and then have a single spare cycle (a no operation or NOP cycle) available before it needs to perform more searches. Known TCAMs may not be able use a single spare cycle that occurs between searches. This is because the TCAM 100 may require two cycles to write a code to a functional cell. If a partial update, i.e., an update of only the X or Y value, were performed on a TCAM entry, the functional cell would contain invalid data. If a search word were to be compared to a partially updated entry, the compare operation would produce unpredictable results. Generally, it is important that compare operations produce accurate results. Thus, known TCAMs may not be able to make productive use of a spare single cycle.

According to various embodiments, the valid row logic 110 may modify the addressing method in which the TCAM data is accessed when the TCAM is searched using the content addressing method. According to various embodiments, a partial update may be performed on the X or Y bit in a first cycle, e.g., a single spare cycle. In response, the valid row logic cell 110 causes the partially updated cell to be forced to resolve to a miss on subsequent searches until the cell is fully updated in a second cycle, e.g., the next single spare cycle. In various embodiments, when a partial update is performed, the valid row logic cell 110 is set to pull the match line ML to a logic low state during a search operation. In the second partial write cycle, the cell is fully updated and the valid row logic cell 110 is set so that it does not pull the match line ML low, allowing a potential match to occur. As a result, a compare operation will always miss when evaluating a TCAM functional cell in which an update has been performed to only the X or only the Y bit but not to both halves of the entry. This enables architectural and throughput advantages because a partial update can be done in a single spare cycle instead of requiring two spare cycles between searches.

Figure 2:
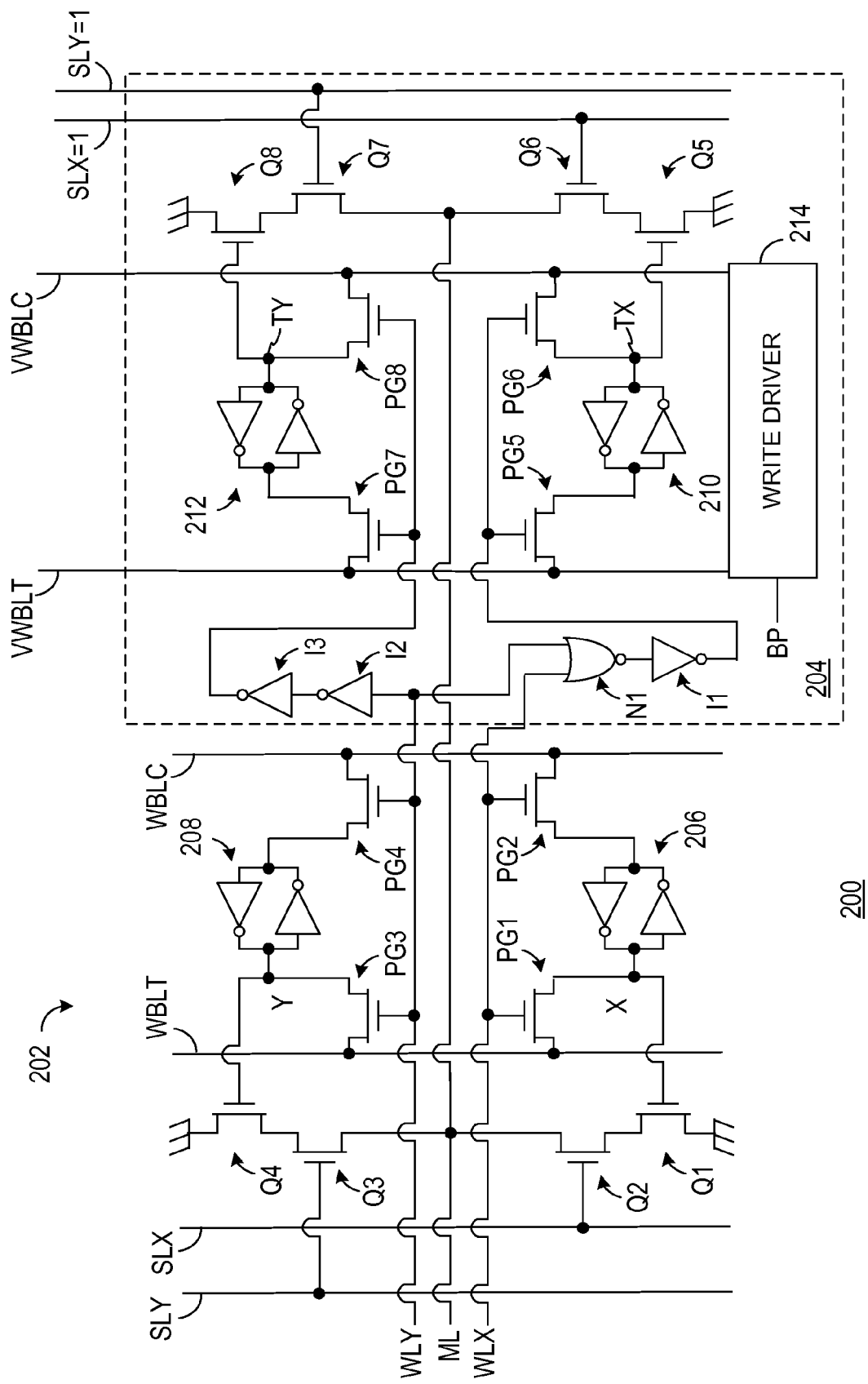
FIG. 2 is a block diagram of a portion of the TCAM of FIG. 1 according to an embodiment.

FIG. 2 is a block diagram of a portion 200 of an exemplary TCAM according to one embodiment. The shown portion 200 includes one functional cell 202 and one valid row logic cell 204 of one row of a TCAM. Although only one functional cell 202 of one row of a TCAM is shown, the TCAM may have multiple additional cells in the row and multiple additional rows. Each additional row may include a valid row logic cell 204.

The functional cell 202 includes two storage elements: cross-coupled inverters 206 for storing an X bit and cross-coupled inverters 208 for storing a Y bit. An X bit may be stored by asserting WLX and placing the desired bit value and its complement on WBLT and WBLC, respectively. When WLX is high, pass gates PG1 and PG2 enable an X bit to be stored. Similarly, a Y bit may be stored by asserting WLY and placing the desired bit value and its complement on WBLT and WBLC, respectively. When WLY is high, pass gates PG3 and PG4 enable a Y bit to be stored. As mentioned, the X bit and Y bit are stored in separate cycles.

To determine whether a bit of a search word matches the value stored in functional cell 202, the match line ML is precharged to a logic high value by a precharge device (not shown in FIG. 2, see FIG. 1). The bit of the search word and its complement are placed on SLX and SLY, respectively. Compare logic CL may be implemented by NMOS transistors Q1, Q2, Q3, and Q4. Table 1 below shows states for which compare logic will detect a match and will not pull a precharged match line ML low:

TABLE 1

| X | Y | SLX | SLY | RESULT |
|---|---|-----|-----|--------|
| 1 | 0 | 0 | 1 | MATCH |
| 0 | 1 | 1 | 0 | MATCH |
| 0 | 0 | X | X | MATCH |

The valid row logic cell 204 is configured for a TCAM architecture in which the X bit of a TCAM cell is always updated first, followed with an update of the Y bit. The valid row logic cell 204 allows for searches of the TCAM to be performed after the X bit of the cell 202 has been updated in a first cycle but before the Y bit of the cell is updated in a second cycle. When the X bit of the cell 202 is updated, the match line ML will always resolve to a miss during a search until the Y bit of the cell is updated.

The valid row logic 204 includes two storage elements: cross-coupled inverters 210 for storing a TX bit and cross-coupled inverters 212 for storing a TY bit. As will become apparent during the discussion below of FIG. 3, the cross-coupled inverters 212 are not critical but it may be an advantage to include them for manufacturing reasons. Inclusion of cross-coupled inverters 212 makes for a symmetrical structure, which may be an advantage in manufacturing.

The valid row logic cell 204 may include inverters I1, I2, and I3, and NOR gate N1 on pitch with the storage elements. The NOR gate N1 has its inputs coupled with WLX and WLY. The output of NOR gate N1 is coupled with the input of inverter I1. The output of inverter I1 is coupled with the gates of pass gates PG5 and PG6. When WLX is high, the NOR gate N1 and inverter I1 enable the values on valid write bit line true (VWBLT) and valid write bit line complement (VWBLC) to be stored in the cross-coupled inverters 210. The inverters I2 and I3 are coupled in series with WLY. The output of the second inverter of the series, inverter I3, is coupled with the gates of pass gates PG7 and PG8. When WLY is high, the values on valid write bit line true (VWBLT) and valid write bit line complement (VWBLC) are stored in the cross-coupled inverters 212. The values on VWBLT and VWBLC during a period when either WLX or WLY are high may be determined by write driver 214.

The valid row logic 204 may include a write driver 214. The write driver 214 may receive a configuration signal (BP) that identifies bit position information (X or Y) during a partial update operation. The write driver 214 may receive the configuration signal from decode logic (not shown in FIG. 2). The write driver 214 uses bit position to determine what values to drive on to VWBLT and VWBLC. In a cycle in which a partial update of an X bit is performed, WLX enables the pass gates PG5 and PG6 and the write driver 214 places a logic 0 on VWBLT and a logic 1 on VWBLC. This stores a logic 1 on the TX node. No change is made to the TY node. In a cycle in which a partial update of a Y bit is performed, WLY enables the pass gates PG5 and PG6 and the pass gates PG7 and PG8. In addition, the write driver 214 places a logic 1 on VWBLT and a logic 0 on VWBLC. This stores a logic 0 on both the TX and TY nodes.

The valid row logic cell 204 may be associated with SLX and SLY lines. While designated with the same names used for search lines associated with functional cells, the SLX and SLY lines associated with a valid row logic cell 204 are not used for signaling bits of a search word. The SLX and SLY lines are coupled to the cross-coupled inverters 210 and cross-coupled inverters 212 via valid row logic cell compare logic. This compare logic includes NMOS transistors Q5, Q6, Q7, and Q8. In the shown embodiment, the SLX and SLY lines for the valid logic 204 are tied high. In various embodiments, a logic 1 may be present on the SLX and SLY lines during a search operation.

In operation, WLX is asserted and a partial update of an X bit of functional cell is performed in a first cycle. In response to the assertion of WLX, write driver 214 places a logic 1 on VWBLC and a logic 1 is stored on the TX node. In a subsequent search operation, the logic 1 on the TX node turns on Q5 and the logic 1 on VWBLC turns on Q6, creating a path from the match line ML to ground. In other words, in a subsequent search operation, the match line ML will always signal a miss.

In a second cycle, WLY is asserted and an update of the Y bit of the functional cell is performed. This turns the partial update into a complete update. In response to the assertion of WLY, write driver 214 places a logic 0 on VWBLC and a logic 1 on VWBLT. Both the pair PG5 and PG6 and the pair PG7 and PG8 are enabled. Thus, a logic 0 is stored on the TX node and a logic 0 is stored on the TY node. In a subsequent search operation, the logic 0 on the TX node turns Q5 off and the logic 0 on the TY node turns Q8 off, preventing the valid row logic cell 204 from providing a path from the match line ML to ground. This makes the valid row logic cell 204 a "don't care" with respect to the match line ML. Whether the match line ML signals a hit or a miss during a search will be determined by the functional cells associated with ML. The valid row logic cell 204 will not influence the ML signal.

Figure 3:
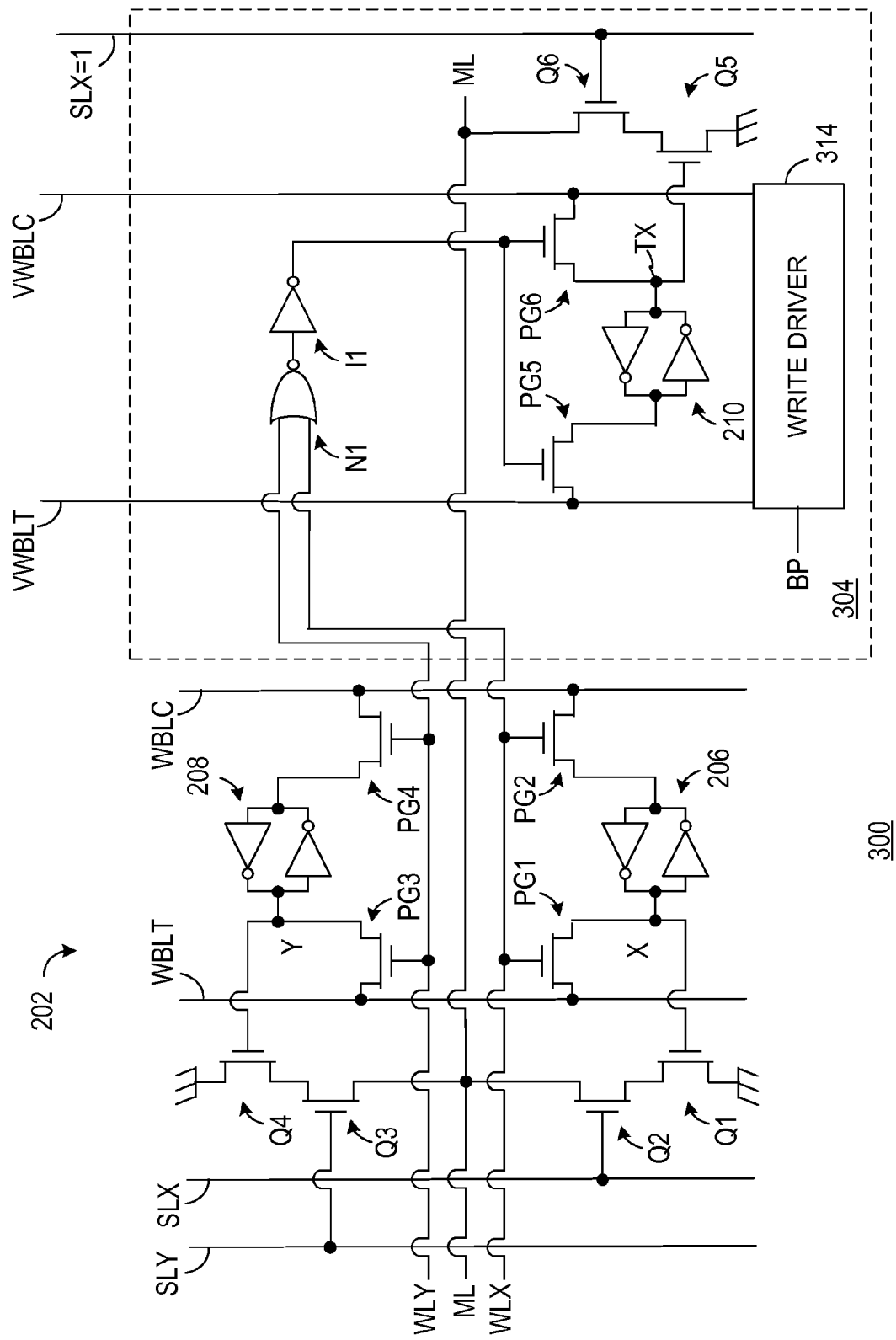
FIG. 3 is a block diagram of a portion of the TCAM of FIG. 1 according to an embodiment.

FIG. 3 is a block diagram of a portion 300 of an exemplary TCAM according to one embodiment. The shown portion 300 includes the functional cell 202 of FIG. 2. As with FIG. 2, the TCAM may have multiple additional cells in the row and multiple additional rows. Each additional row may include a valid row logic cell 304. As with the valid row logic cell 204, the valid row logic cell 304 is configured for a TCAM architecture in which the X bit of a TCAM cell is always updated first, followed with an update of the Y bit. The valid row logic 304 is similar to valid row logic 204 shown in FIG. 2. The valid row logic 304 uses less circuitry and may use less area than valid row logic 204, which may be an advantage. The valid row logic 304 may use less power than valid row logic 204, which may be another advantage.

The valid row logic 304 includes one storage element: cross-coupled inverters 210 for storing a TX bit. The valid row logic cell 304 may include the inverter I1 and NOR gate N1 on pitch with the storage element. As with the valid row logic cell 204, the NOR gate N1 has its inputs coupled with WLX and WLY. The output of NOR gate N1 is coupled with the input of inverter I1 and the output of inverter I1 is coupled with the gates of pass gates PG5 and PG6. The valid row logic 304 may include a write driver 314. The write driver 314 may receive a configuration signal (BP) that identifies bit position information (X or Y) during a partial update operation. The write driver 314 may receive the configuration signal from decode logic (not shown in FIG. 3). The write driver 314 uses bit position to determine what values to drive on to VWBLT and VWBLC.

When WLX is high, the NOR gate N1 and inverter I1 enable the values on valid write bit line true (VWBLT) and valid write bit line complement (VWBLC) to be stored in the cross-coupled inverters 210. The values on VWBLT and VWBLC during a period when either WLX or WLY are high may be determined by write driver 314.

In a cycle in which a partial update of an X bit is performed, WLX enables the pass gates PG5 and PG6 and the write driver 314 places a logic 0 on VWBLT and a logic 1 on VWBLC. This stores a logic 1 on the TX node. In a cycle in which a partial update of a Y bit is performed, WLY enables the pass gates PG5 and PG6. In addition, the write driver 314 places a logic 1 on VWBLT and a logic 0 on VWBLC. This stores a logic 0 on the TX node.

The valid row logic 304 is associated with an SLX line. The SLX line is coupled to the cross-coupled inverters 210 via valid row logic cell compare logic. This compare logic includes NMOS transistors Q5 and Q6. In the shown embodiment, a logic 1 may be placed on the SLX line for the valid logic 304 during the evaluation phase of a search.

In a first write operation, WLX is asserted and a partial update of an X bit of a functional cell is performed in a first cycle. In response to the assertion of WLX, write driver 314 places a logic 1 on VWBLC and a logic 1 is stored on the TX node. In a subsequent search operation, the logic 1 on the TX node turns on Q5 and the logic 1 on VWBLC turns on Q6, creating a path from the match line ML to ground. In other words, in a subsequent search operation, the match line ML will always signal a miss.

In a second write operation, WLY is asserted and an update of the Y bit of the functional cell is performed. This turns the partial update into a complete update. In response to the assertion of WLY, write driver 314 places a logic 0 on VWBLC and a logic 1 on VWBLT. PG5 and PG6 are enabled. Thus, a logic 0 is stored on the TX node. In a subsequent search operation, the logic 0 on the TX node turns Q5 off, preventing the valid row logic cell 304 from providing a path from the match line ML to ground. This makes the valid row logic cell 304 a "don't care" with respect to the match line ML. Whether the match line ML signals a hit or a miss during a search will be determined by the functional cells associated with ML. The valid row logic cell 304 will not influence the ML signal.

The exemplary valid row logic cells 204 and 304 variously may include inverters I1, I2, and I3, and NOR gate N1. In various embodiments, the functions performed by these devices may performed by one or more other logic devices performing an equivalent function as will be appreciated by one of ordinary skill in the art.

Figure 4:
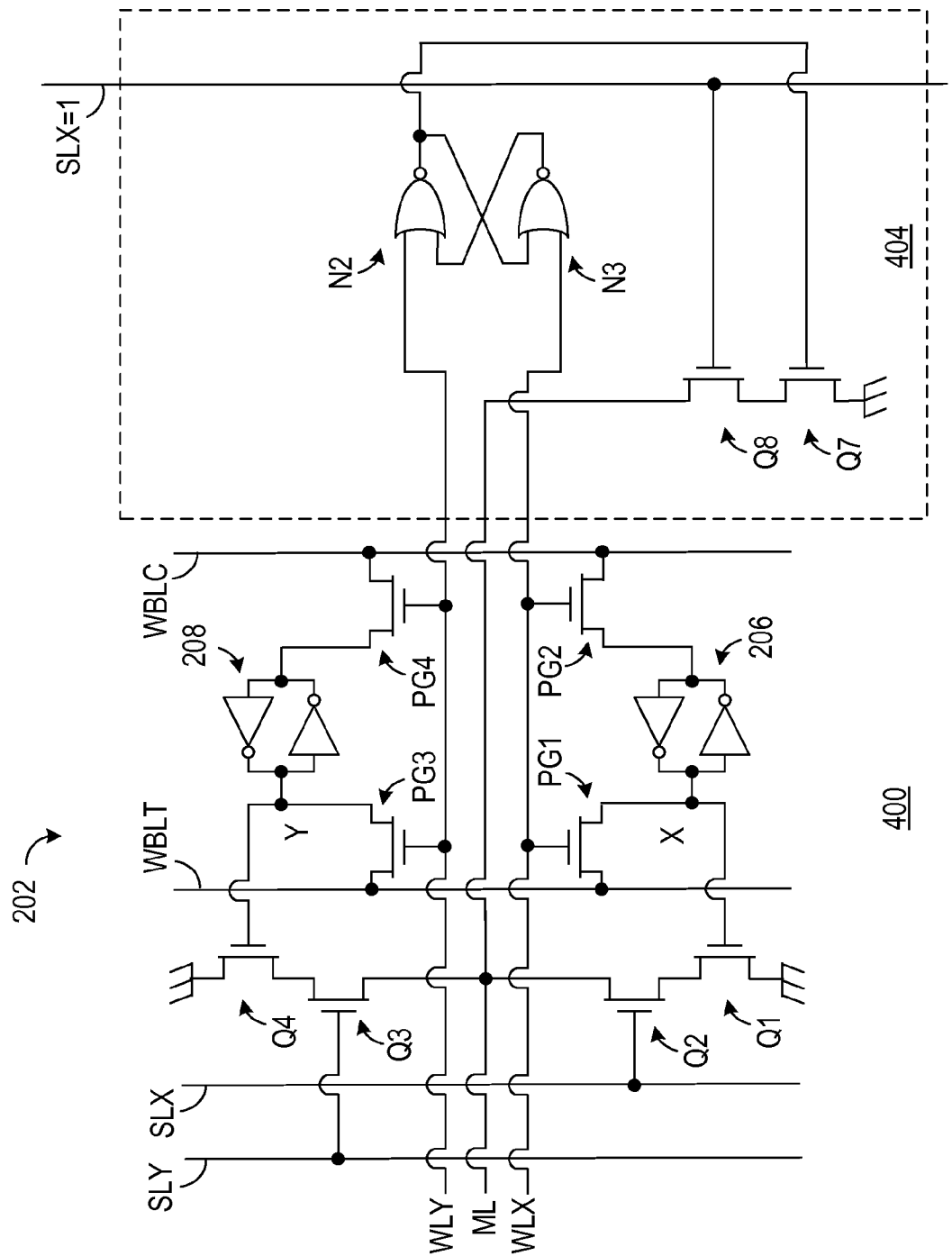
FIG. 4 is a block diagram of a portion of the TCAM of FIG. 1 according to an embodiment.

FIG. 4 is a block diagram of a portion 400 of an exemplary TCAM according to one embodiment. The shown portion 400 includes the functional cell 202 of FIG. 2. As with the previously described embodiments, the TCAM may have multiple additional cells in the row and multiple additional rows. Each additional row may include a valid row logic cell 404. As with the valid row logic cells 204 and 304, the valid row logic cell 404 is configured for a TCAM architecture in which the X bit of a TCAM cell is always updated first, followed with an update of the Y bit.

The valid row logic cell 404 includes a NOR based Set Reset (SR) Latch. The SR Latch includes NOR gates N2 and N3. The SR latch has its inputs coupled with WLX and WLY. WLX is coupled to one input of NOR gate N3. WLY is coupled to one input of NOR gate N2. The output of the SR latch, i.e., the output NOR gate N2, is coupled with the gate of an NFET Q7. The NFET Q7 is connected between ground and an NFET Q8. The NFET Q8 is connected between Q7 and the match line ML. The gate of Q8 is connected to an SLX line associated with the valid row logic cell 404. A logic 1 may be placed on the SLX line for the valid logic 404 during the evaluation phase of a search.

In a first write operation, WLX is asserted and a partial update of an X bit of functional cell is performed in a first cycle. When WLX is asserted, a logic 1 is placed on the input of NOR gate N3. This causes a logic 0 to be output from N3, which in turn causes logic 1 to be output from NOR gate N2. This logic 1 causes NFET Q7 to turn on. The logic 1 on SLX causes NFET Q8 to turn on. With NFET Q7 and NFET Q8 on, the match line ML is pulled to ground during a search operation. Thus, asserting WLX programs the match line ML to always signal a miss in a search operation.

In a second write operation, WLY is asserted and an update of the Y bit of the functional cell is performed. This turns the partial update into a complete update. When WLY is asserted, WLX will be low. The assertion of WLY causes a logic 1 to be placed on the input of NOR gate N2. This causes a logic 0 to be output from N2, which in turn causes logic 1 to be output from NOR gate N3. This logic 0 output from N2 causes NFET Q7 to turn off. With Q7 off, valid row logic cell 404 is prevented from providing a path from the match line ML to ground. In a subsequent search operation, the valid row logic cell 404 will not influence the ML signal.

The exemplary valid row logic cells includes an NOR type SR Latch. In various embodiments, the functions performed by this SR Latch may performed by one or more other logic devices performing an equivalent function as will be appreciated by one of ordinary skill in the art. As one example, a NAND type SR Latch may be used in various embodiments.

Figure 5:
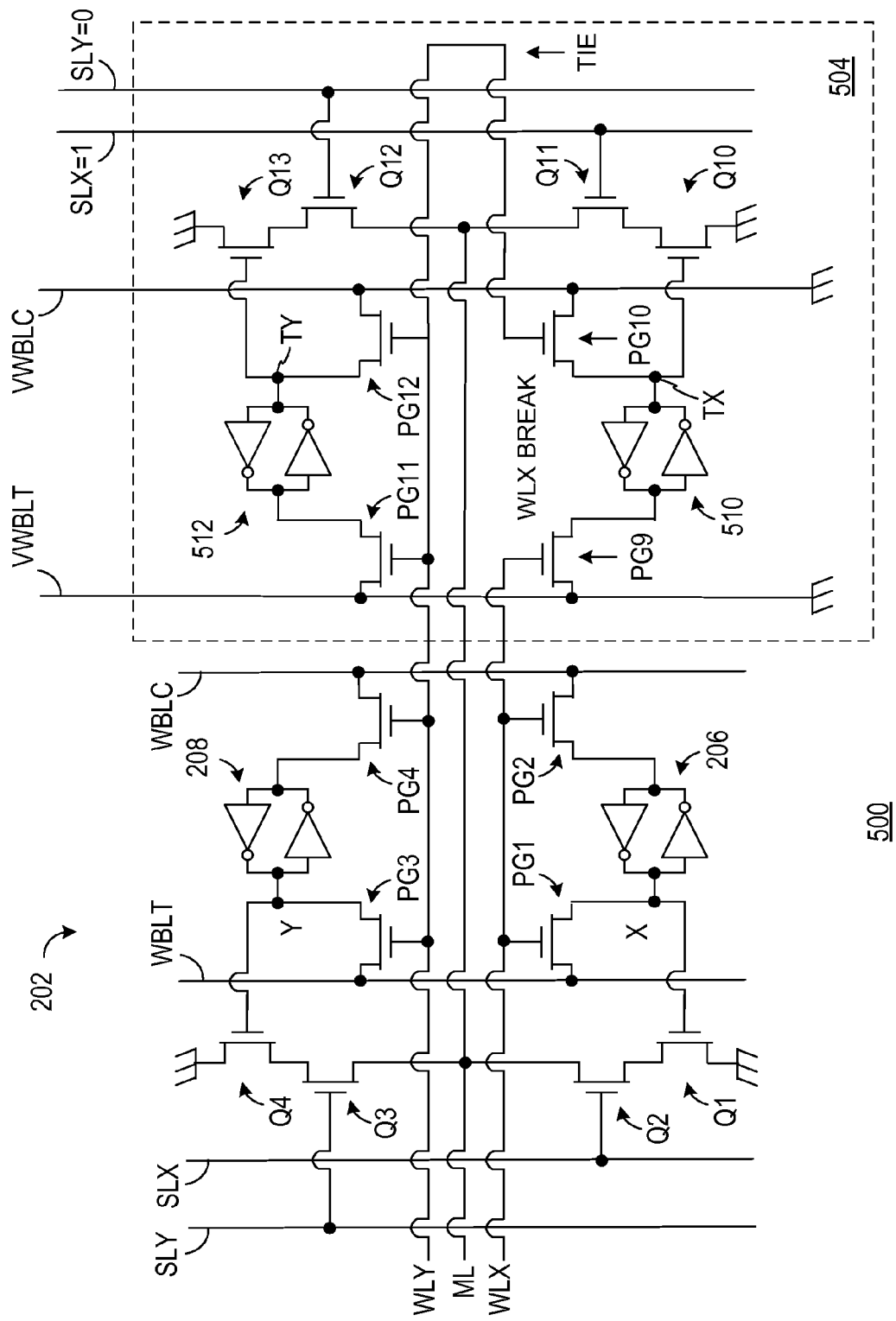
FIG. 5 is a block diagram of a portion of the TCAM of FIG. 1 according to an embodiment.

FIG. 5 is a block diagram of a portion 500 of an exemplary TCAM according to one embodiment. The shown portion 500 includes the functional cell 202 of FIG. 2. As with the previously described embodiments, the TCAM may have multiple additional cells in the row and multiple additional rows. Each additional row may include a valid row logic cell 504. As with the valid row logic cells 204, 304, and 404, the valid row logic cell 504 is configured for a TCAM architecture in which the X bit of a TCAM cell is always updated first, followed with an update of the Y bit.

The valid row logic cell 504 includes two storage elements: cross-coupled inverters 510 for storing a TX bit and cross-coupled inverters 512 for storing a TY bit. As will become apparent during the discussion below of FIG. 6, the cross-coupled inverters 512 are not critical but it may be an advantage to include them for manufacturing reasons. Inclusion of cross-coupled inverters 512 makes for a symmetrical structure, which may be an advantage in manufacturing.

The cross-coupled inverters 510 are coupled at a right node with pass gate PG9 and at a left node with pass gate PG10. The cross-coupled inverters 512 are coupled at a right node with pass gate PG11 and at a left node with pass gate PG12.

WLX is coupled with the gate of pass gate PG9. After pass gate PG9, there is a figurative "break" in WLX (as compared with valid row logic cells 204 and 304). WLY is coupled with the gate of pass gates PG11, PG12. In addition, WLY is coupled with the gate of pass gate PG10. WLY is figuratively "tied" to WLX (as compared with valid row logic cells 204 and 304), at least up to the point where it terminates at the gate of pass gate PG10.

The valid row logic cell 504 may be associated with VWBLT and VWBLC lines. The VWBLT and VWBLC lines may be tied low during a write. When WLX is high, pass gate PG9 turns on enabling a logic 0 on VWBLT to be stored on the left node the cross-coupled inverters 510. When WLY is high, pass gates PG11, PG12, turn on enabling the logic 0 values on VWBLT and VWBLC to be stored on the nodes of the cross-coupled inverters 512. In addition, when WLY is high, pass gate PG10 turns on enabling the logic 0 on VWBLC to be stored on the right node of the cross-coupled inverters 510.

The valid row logic cell 504 includes NMOS transistors Q10, Q11, Q12, and Q13. The valid row logic cell 504 may be associated with an SLX and SLY line. During the evaluation phase of a search, a logic 1 may be placed on the SLX line and a logic 0 may be placed on the SLY line. In one alternative, the SLY line may be tied low. While designated with the same names used for search lines associated with functional cells, the SLX and SLY lines associated with a valid row logic cell 504 are not used for signaling bits of a search word. The SLX and SLY lines are coupled to the cross-coupled inverters 510 and cross-coupled inverters 512 via the NMOS transistors Q10, Q11, Q12, and Q13.

In operation, during a first cycle in which a partial update of an X bit is performed, WLX is high, which turns on the pass gate PG9. Thus, when WLX is high, a logical 0 is stored on the left node of cross-coupled inverters 510. Operation of the cross-coupled inverters 510 causes a logical 1 to be stored on the TX node in response to the logical 0 on the left node. The logical 1 on the TX node is coupled with the gate of NMOS transistor Q10. The logical 1 on TX turns Q10 on. In addition, NMOS transistor Q11 is turned on because of the logical 1 placed on its gate by the SLX line. In a subsequent search operation, the match line ML will always signal a miss. This is because the logic 1 on the TX node turns on Q10 and the logic 1 on VWBLC turns on Q11, creating a path from the match line ML to ground.

In a second cycle in which a partial update of a Y bit is performed, WLY is asserted and a bit value is written to the Y bit of the functional cell. This turns the partial update of the functional cell into a complete update. In response to the assertion of WLY, pass gate PG10 is turned on. With PG10 on, a path is created via VWBLC between the TX node and ground. Thus, the TX node transitions from a logic 1 to logic 0. The logic 0 on TX turns off NMOS transistor Q10, disconnecting the match line ML from ground. In addition, in response to the assertion of WLY, the pass gates PG11 and P12 are turned on. When pass gates PG11 and P12 are on, logic 0s are transferred to both nodes of cross-coupled inverters 512.

In a subsequent search operation, the logic 0 on the TX node keeps Q10 off and the logic 0 on the TY keeps Q13 off, preventing the valid row logic cell 504 from providing a path from the match line ML to ground. This makes the valid row logic cell 504 a "don't care" with respect to the match line ML. Whether the match line ML signals a hit or a miss during a search will be determined by the functional cells associated with ML. The valid row logic cell 504 will not influence the ML signal.

Figure 6:
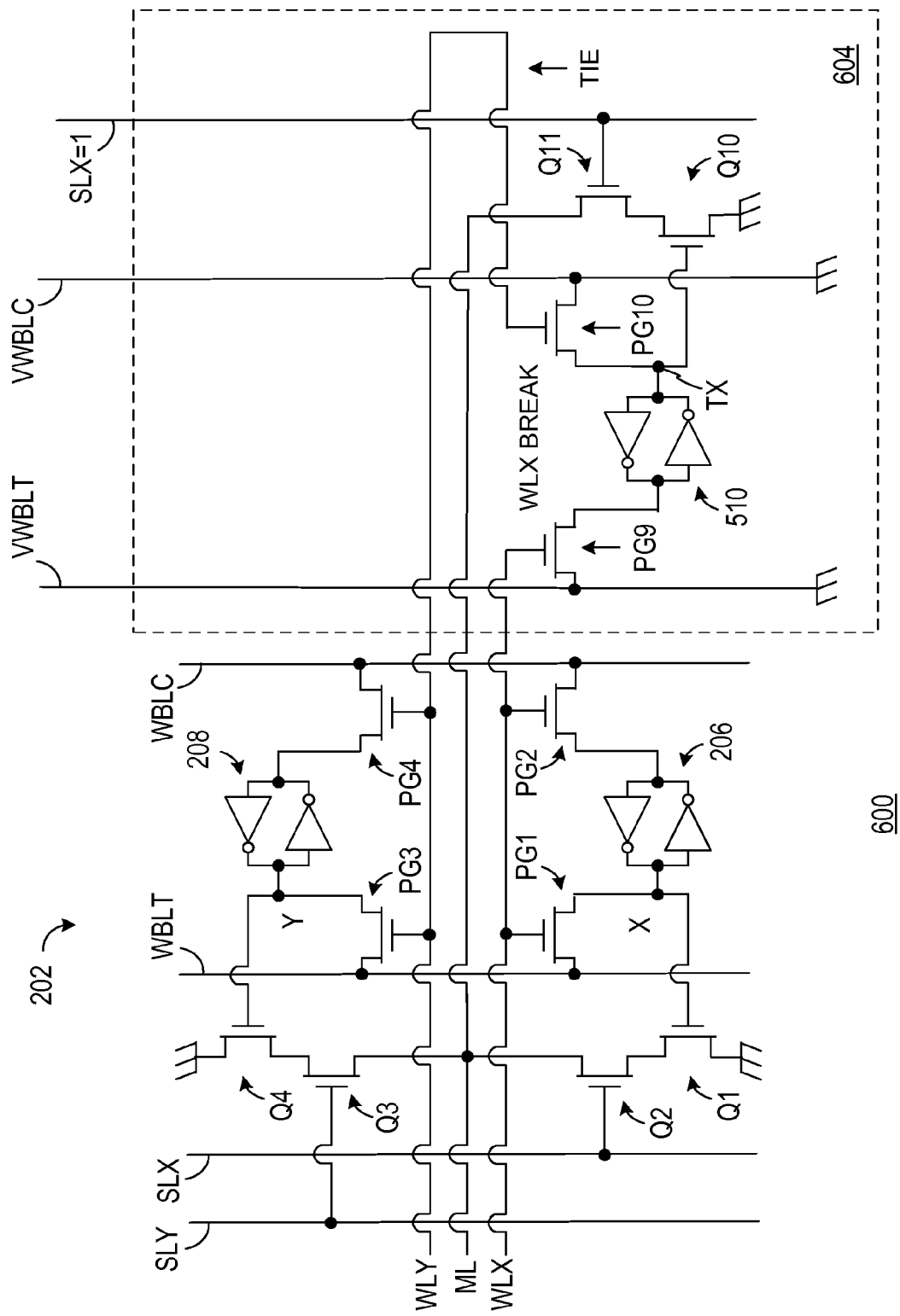
FIG. 6 is a block diagram of a portion of the TCAM of FIG. 1 according to an embodiment.

FIG. 6 is a block diagram of a portion 600 of an exemplary TCAM according to one embodiment. The shown portion 600 includes the functional cell 202 of FIG. 2. As with the previously described embodiments, the TCAM may have multiple additional cells in the row and multiple additional rows. Each additional row may include a valid row logic cell 604. As with the valid row logic cells 204, 304, 404, and 504, the valid row logic cell 604 is configured for a TCAM architecture in which the X bit of a TCAM cell is always updated first, followed with an update of the Y bit.

The valid row logic cell 604 includes one storage element: cross-coupled inverters 510 for storing a TX bit. The cross-coupled inverters 510 are coupled at a right node with pass gate PG9 and at a left node with pass gate PG10.

WLX is coupled with the gate of pass gate PG9. After pass gate PG9, there is a figurative "break" in WLX (as compared with valid row logic cells 204 and 304). WLY is coupled with the gate of pass gate PG10. WLY is figuratively "tied" to WLX (as compared with valid row logic cells 204 and 304), at least up to the point where it terminates at the gate of pass gate PG10.

The valid row logic cell 604 may be associated with VWBLT and VWBLC lines. The VWBLT and VWBLC lines may be tied low during a write. When WLX is high, pass gate PG9 turns on enabling a logic 0 on VWBLT to be stored on the left node the cross-coupled inverters 510. When WLY is high, pass gate PG10 turns on enabling the logic 0 on VWBLC to be stored on the right node of the cross-coupled inverters 510.

The valid row logic cell 604 includes NMOS transistors Q10 and Q11. The valid row logic cell 604 may be associated with an SLX line. During the evaluation phase of a search, a logic 1 may be placed on the SLX line. While designated with the same names used for search lines associated with functional cells, the SLX line associated with a valid row logic cell 604 is not used for signaling a bit of a search word. The SLX line is coupled to the cross-coupled inverters 510 via the NMOS transistors Q10 and Q11.

In a first write operation, during a first cycle in which a partial update of an X bit is performed, WLX is high, which turns on the pass gate PG9. Thus, when WLX is high, a logical 0 is stored on the left node of cross-coupled inverters 510. Operation of the cross-coupled inverters 510 causes a logical 1 to be stored on the TX node in response to the logical 0 on the left node. The logical 1 on the TX node is coupled with the gate of NMOS transistor Q10. The logical 1 on TX turns Q10 on. In addition, NMOS transistor Q11 is turned on because of the logical 1 placed on its gate by the SLX line. In a subsequent search operation, the match line ML will always signal a miss. This is because the logic 1 on the TX node turns on Q10 and the logic 1 on VWBLC turns on Q11, creating a path from the match line ML to ground.

In a write operation in which a partial update of a Y bit is performed, WLY is asserted and a bit value is written to the Y bit of the functional cell. This turns the partial update of the functional cell into a complete update. In response to the assertion of WLY, pass gate PG10 is turned on. With PG10 on, a path is created via VWBLC between the TX node and ground. Thus, the TX node transitions from a logic 1 to logic 0. The logic 0 on TX turns off NMOS transistor Q10, disconnecting the match line ML from ground.

In a subsequent search operation, the logic 0 on the TX node keeps Q10, preventing the valid row logic cell 604 from providing a path from the match line ML to ground. This makes the valid row logic cell 604 a "don't care" with respect to the match line ML. Whether the match line ML signals a hit or a miss during a search will be determined by the functional cells associated with ML. The valid row logic cell 604 will not influence the ML signal.

The exemplary valid row logic cells 204, 304, 404, 504, and 604 are configured for a TCAM architecture in which the X bit of a TCAM cell is always updated first, followed with an update of the Y bit. In various embodiments, the valid row logic cells 204, 304, 404, 504, and 604 may be modified so as to be configured for a TCAM architecture in which the Y bit of a TCAM cell is always updated first, followed with an update of the X bit. One of ordinary skill in the art will understand how to make the respective modifications using symmetry of the X and Y elements.

The exemplary valid row logic cells 204, 304, 404, 504, and 604 employ various NMOS devices. In various embodiments, the valid row logic cells 204, 304, 404, 504, and 604 may employ PMOS devices. One of ordinary skill in the art will understand how to modify the various signals for the use of PMOS devices.

Figure 7:
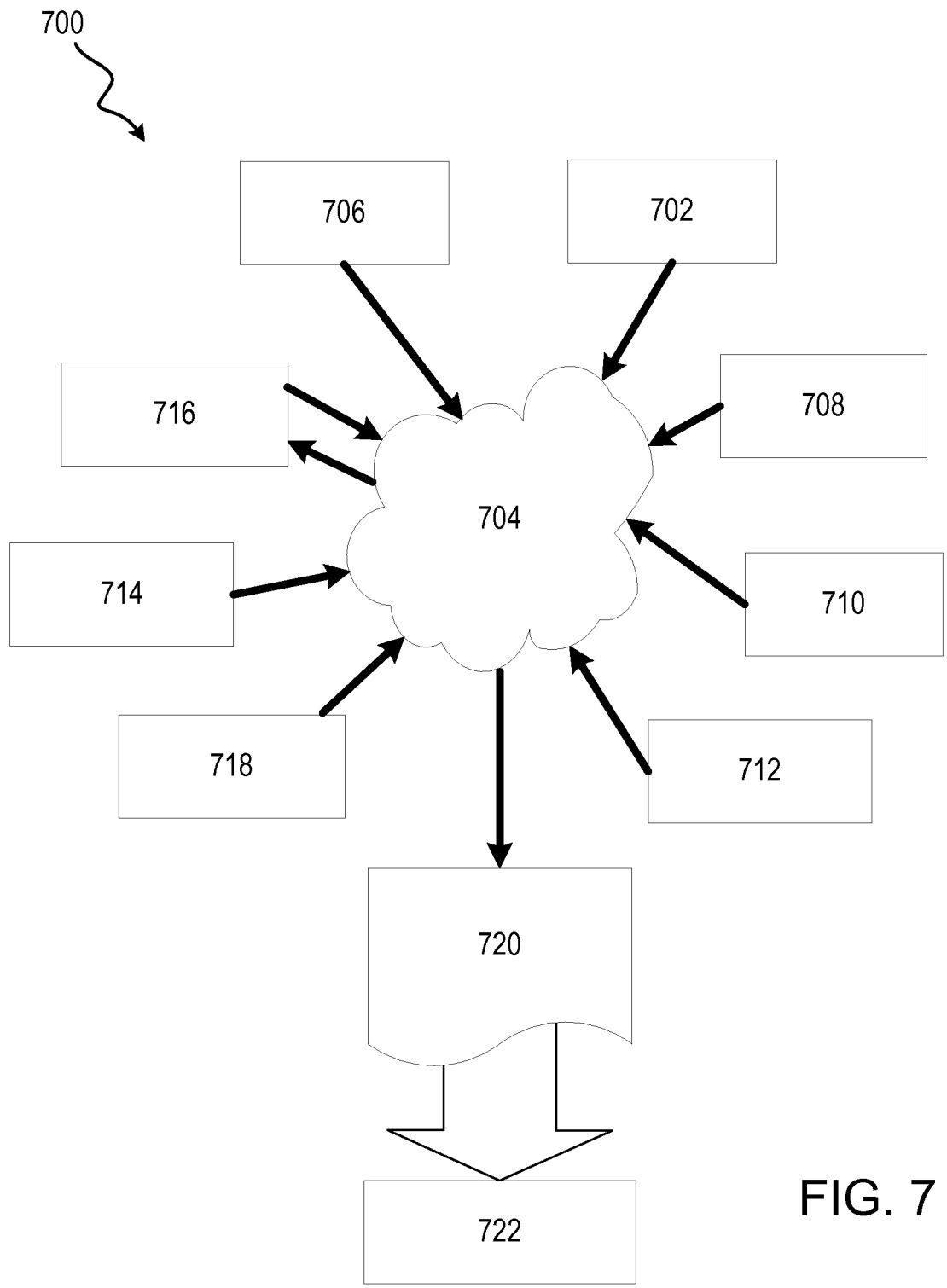
FIG. 7 is a flow diagram of a design process used in a semiconductor design, manufacturing, or testing according to various embodiments.

FIG. 7 shows a block diagram of an example design flow 700. Design flow 700 may vary depending on the type of IC being designed. For example, a design flow 700 for building an application specific IC (ASIC) may differ from a design flow 700 for designing a standard component. Design structure 702 is preferably an input to a design process 704 and may come from an IP provider, a core developer, or other design company or may be generated by the operator of the design flow, or from other sources. Design structure 702 may include valid row logic cells 204, 304, 404, 504, or 604, and all or a portion of TCAM 100, in the form of schematics or HDL, a hardware-description language, for example, Verilog, VHDL, C, and the like. Design structure 702 is tangibly contained on, for example, one or more machine readable storage medium. For example, design structure 702 may be a text file or a graphical representation of valid row logic cells 204, 304, 404, 504, or 604, and all or a portion of TCAM 100. Design process 704 preferably synthesizes, or translates, valid row logic cells 204, 304, 404, 504, or 604, and all or a portion of TCAM 100 into a netlist 706, where netlist 706 is, for example, a list of wires, transistors, logic gates, control circuits, I/O, models, etc. that describes the connections to other elements and circuits in an integrated circuit design and recorded on at least one of machine readable storage medium. This may be an iterative process in which netlist 706 is resynthesized one or more times depending on design specifications and parameters for the circuit.

Design process 704 may include using a variety of inputs; for example, inputs from library elements 708 which may house a set of commonly used elements, circuits, and devices, including models, layouts, and symbolic representations, for a given manufacturing technology, such as different technology nodes, 32 nm, 45 nm, 90 nm, and the like, design specifications 710, characterization data 712, verification data 714, design rules 716, and test data files 718, which may include test patterns and other testing information. Design process 704 may further include, for example, standard circuit design processes such as timing analysis, verification, design rule checking, place and route operations, and the like. One of ordinary skill in the art of integrated circuit design can appreciate the extent of possible electronic design automation tools and applications used in design process 704 without deviating from the scope and spirit of the invention. The design structure of the invention is not limited to any specific design flow.

Design process 704 preferably translates an embodiment of the invention as shown in FIGS. 1-6 along with any additional integrated circuit design or data (if applicable), into a second design structure 720. Design structure 720 resides on a machine readable storage medium in a data format used for the exchange of layout data of integrated circuits, for example, information stored in a GDSII (GDS2), GL1, OASIS, or any other suitable format for storing such design structures. Design structure 720 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1-6. Design structure 720 may then proceed to a stage 722 where, for example, design structure 720 proceeds to tape-out, is released to manufacturing, is released to a mask house, is sent to another design house, is sent back to the customer, and the like.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

A variety of examples are presented in this Detailed Description. These examples may be referred to as exemplary. Note that the term "exemplary," as used in this Detailed Description, simply means an example, instance, or illustration. This term is not used to mean that a particular example is superior, commendable, or otherwise deserving of imitation over other examples.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

While this disclosure has described the details of various embodiments shown in the drawings, these details are not intended to limit the scope of the inventions as claimed in the appended claims.

What is claimed is:

1. A method for accessing a ternary content addressable memory (TCAM), the TCAM having a plurality of rows of cells, each row having a match line, each cell having storage elements for storing first and second bits, each cell including compare circuitry for determining matches between a bit of a search word and data stored in the cell, the compare circuitry to signal a match on a match line of an associated row, comprising:
    storing a first bit in a first storage element of a cell in a first row of the TCAM, wherein a valid row cell is associated with the first row, the valid row cell having at least one element to store a partial update indication;
    in response to storing the first bit in the first storage element, enabling the partial update indication of the valid row cell; and in response to a signal to determine matches between bits of a search word and data stored the cells, signaling by the valid row cell that the first row of the TCAM does not match the search word when the partial update indication associated with the first row of the TCAM is enabled.

2. The method of claim 1, further comprising:

storing a second bit in the first storage element;

in response to storing the second bit in the first storage element, disabling the partial update indication associated with the first row of the TCAM; and in response to the signal to determine matches between bits of a search word and data stored the cells, wherein the determination of matches between bits of a search word and data stored in cells of the first row is performed solely by the compare circuitry without influence of the valid row cell when the partial update indication associated with the first row is disabled.

3. The method of claim 1, further comprising:

storing a second bit in a second storage element of the cell;

in response to storing the second bit in the second storage element, disabling the partial update indication associated with the first row of the TCAM.

4. The method of claim 1, wherein the first storage element stores an X bit and the second storage element stores a Y bit.

5. The method of claim 1, wherein the first row includes a first write line for signaling a storing of a data bit in a first storage element of a cell of the first row and a second write line for signaling a storing of a data bit in a second storage element of a cell of the first row, and wherein;

a signal on the first write line to store a data bit in a first cell of the first row enables the partial update indication associated with the first row.

* * * * *